United States Patent [19]
Acoff

[11] Patent Number: 5,769,030
[45] Date of Patent: Jun. 23, 1998

[54] ANIMAL TRAINING AND CONDITIONING APPARATUS

[76] Inventor: Marcus La'Roi Acoff, 4114 Fletcher Dr., Garland, Tex. 75044

[21] Appl. No.: 814,263

[22] Filed: Mar. 10, 1997

[51] Int. Cl.$^6$ .................................................. A01K 15/00
[52] U.S. Cl. .......................... 119/712; 119/850; 119/856; 119/907
[58] Field of Search .................................... 119/712, 792, 119/850, 856, 907; 54/79.1, 79.4

[56] References Cited

U.S. PATENT DOCUMENTS

| | | | |
|---|---|---|---|
| 1,508,601 | 9/1924 | Huff | 119/856 X |
| 3,999,521 | 12/1976 | Puiello | 119/907 X |
| 4,530,309 | 7/1985 | Collins | 119/907 X |
| 4,559,906 | 12/1985 | Smith | 119/907 X |

*Primary Examiner*—Robert P. Swiatek
*Attorney, Agent, or Firm*—Warren & Perez

[57] ABSTRACT

An animal training and conditioning apparatus comprising a collar, a back strap having a first end and a second end, the first end securably attached to the collar at a point behind the animal's neck, a chest strap having a first end and second end, the first end securably attached to the collar at a point in front of the animal's neck and a weighted vest having an upper portion and a lower portion, the upper portion disposed upon the upper side of the animal's torso and securably attached to the second end of the back strap, the lower portion disposed under the lower side of the animal's torso and securably attached to the second end of the chest strap, the upper portion being adjustable relative to the lower portion to provide for a snug and comfortable fit around the animal's torso.

19 Claims, 5 Drawing Sheets

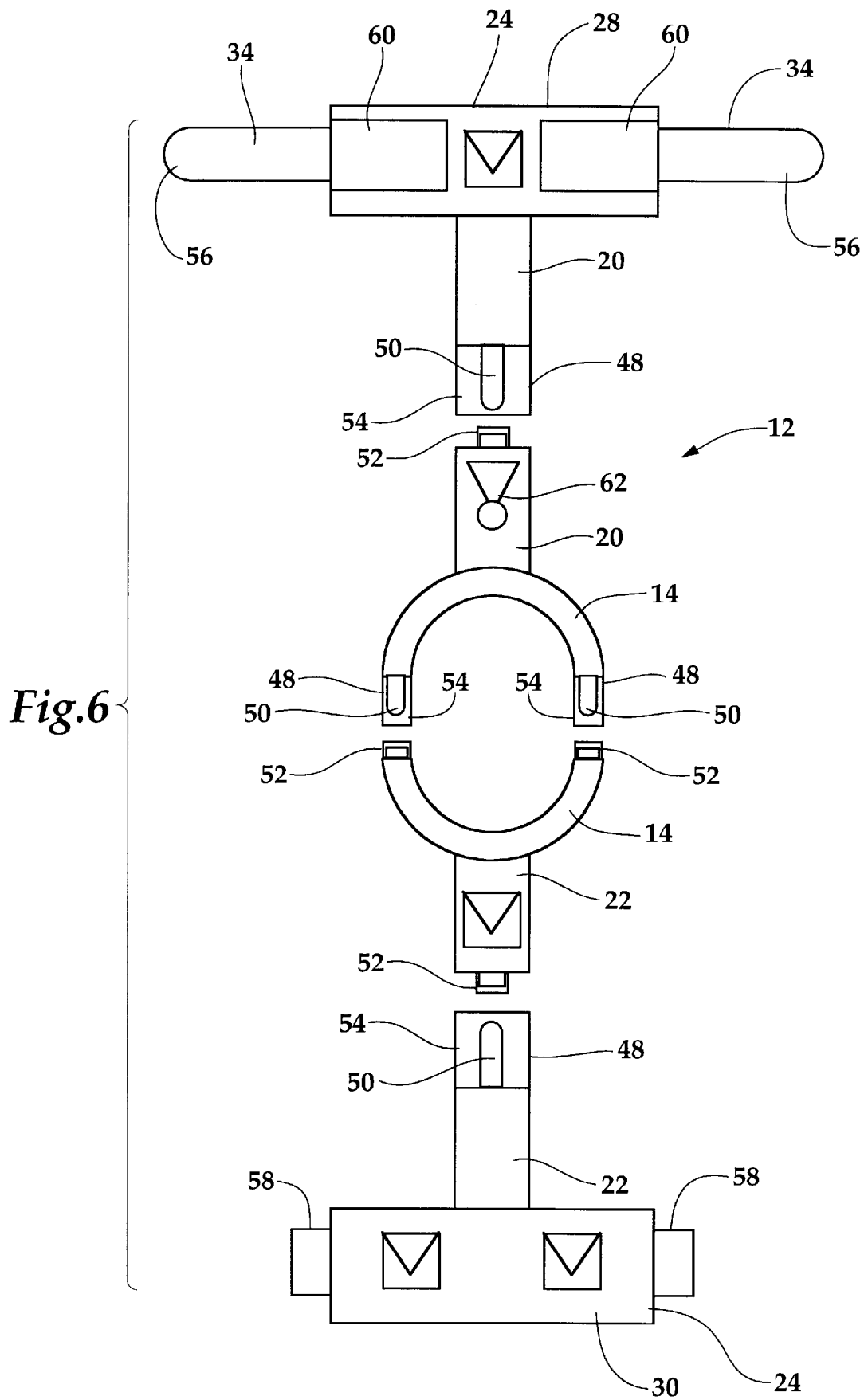

ANIMAL TRAINING AND CONDITIONING APPARATUS

TECHNICAL FIELD OF THE INVENTION

The present invention relates in general to an animal training and conditioning apparatus and, in particular to, an apparatus having weights disposed therein for attaching to an animal to target the training and conditioning of specific muscle groups.

BACKGROUND OF THE INVENTION

Without limiting the scope of the present invention, its background is described with reference to training and conditioning dogs.

Heretofore in this field, dogs have been frequently trained to perform a variety of useful tasks. For example, dogs commonly accompany police officers during investigations and searches. Dogs also commonly accompany fire fighters during fires or after a structure collapses to search for both survivors and victims. Additionally, dogs are useful and, in some cases, necessary companions to the blind as well as other physically challenged individuals. Beyond these extraordinary functions for which dogs may be employed, dogs are commonly kept as pets and on farms and ranches. Hunters also use dogs to assist them in locating and retrieving game. In addition, some dogs participate in competitions such as dog shows or dog racing.

In each of the above examples, it is important that the dog is in peak physical condition. Thus, it is important that the dog be trained and conditioned to improve the dog's physical characteristics such as size, strength, running speed, stamina, and lung capacity as well as their body confirmations. It has been found, however, that many dogs, especially those that live in the city, do not receive the necessary exercise to stay in such peak physical condition.

Dogs that do not receive the necessary exercise and are in poor physical condition exhibit two extreme types of conduct. Some dogs become very hyperactive which makes it nearly impossible to keep them in a confined environment and makes them difficult to train and discipline. Other dogs that do not receive the necessary exercise react in an opposite manner and become very lethargic, lazy or tired. In either case, these conditions are both abnormal and undesirable.

It has been found that the training and conditioning of a dog can be enhanced if the dog is required to exercise carrying more than the dog's own weight. For example, dogs have heretofore been harnessed to a weight, such as a tire or a brick, and been required to pull the weight during exercise. This method, however, is a very uncontrolled and nonscientific way of training and conditioning the dog. In addition, this type of training and conditioning method appears inhumane to many dog lovers.

Therefore, a need has arisen for an animal training and conditioning apparatus that can strategically improve specific physical characteristics of an animal such as muscle tone, speed, stamina, lung capacity and strength, that can achieve these results in a humane manner and that is adjustable to comfortably fit on dogs of a variety of sizes.

SUMMARY OF THE INVENTION

The present invention disclosed herein relates to an animal training and conditioning apparatus for targeting the training and conditioning of specific muscle groups thereby increasing the animal's strength and stamina as well as the animal's running speed and lung capacity, that allows for the training and conditioning of the animal in a humane manner and that is adjustable to fit comfortably on animals of various sizes.

The animal training and conditioning apparatus of the present invention comprises a collar for securing the apparatus around the animal's neck and for preventing the apparatus from sliding toward the animal's hind legs. The collar has a plurality of weights disposed therein which target the training and conditioning of the animal's front legs and neck region. The apparatus also comprises a back strap having a first end and a second end. The first end of the back strap is securely attached to the collar at a point behind the animal's neck. The back strap also includes a plurality of weights disposed therein for targeting the training and conditioning of the animal's front legs and withers region.

The apparatus of the present invention further comprises a chest strap which has a first end and a second end. The first end of the chest strap is securely attached to the collar at a point in front of the animal's neck. The chest strap has a plurality of weights disposed therein for targeting the training and conditioning of the animal's front legs and withers region.

The apparatus of the present invention additionally comprises a weighted vest having an upper portion and a lower portion. The upper portion of the weighted vest is securably attached to the second end of the back strap such that the back strap extends from the collar to the upper portion of the weighted vest down the middle of the animal's back. The lower portion of the weighted vest is securably attached to the second end of the chest strap such that the chest strap extends from the collar to the lower portion of the weighted vest down the middle of the animal's chest and between the animal's front legs.

The upper portion of the weighted vest extends generally perpendicularly from the second end of the back strap and is disposed upon the upper side of the animal's torso. The lower portion of the weighted vest extends generally perpendicularly from the second end of the chest strap and is disposed under the lower side of the animal's torso. The upper portion of the weighted vest is adjustable relative to the lower portion of the weighted vest to provide for a snug and comfortable fit around the animal's torso. The weighted vest has a plurality of weights disposed therein for targeting the training and conditioning of the animal's hind legs.

In one embodiment of the present invention, the upper portion of the weighted vest, the lower portion of the weighted vest, the back strap and the chest strap may include a plurality of pockets disposed thereon for receiving weights therein to respectively provide targeted progressive resistance training of the animal's hind legs, as well as the animal's front legs and withers region.

In another embodiment of the present invention, the back strap and the chest strap are adjustable such that the weighted vest may be properly positioned on the animal's torso. The collar may also include first and second adjustment members disposed between the back strap and the chest strap on opposite sides of the collar such that the size of the collar may be adjusted without altering the position of the back strap or the chest strap on the animal.

BRIEF DESCRIPTION OF THE DRAWINGS

For a more complete understanding of the present invention, reference is now made to the detailed description of the invention along with the following drawings in which like numerals represent like parts and in which:

FIG. 6 is an exploded view of an animal training and conditioning apparatus of the present invention.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
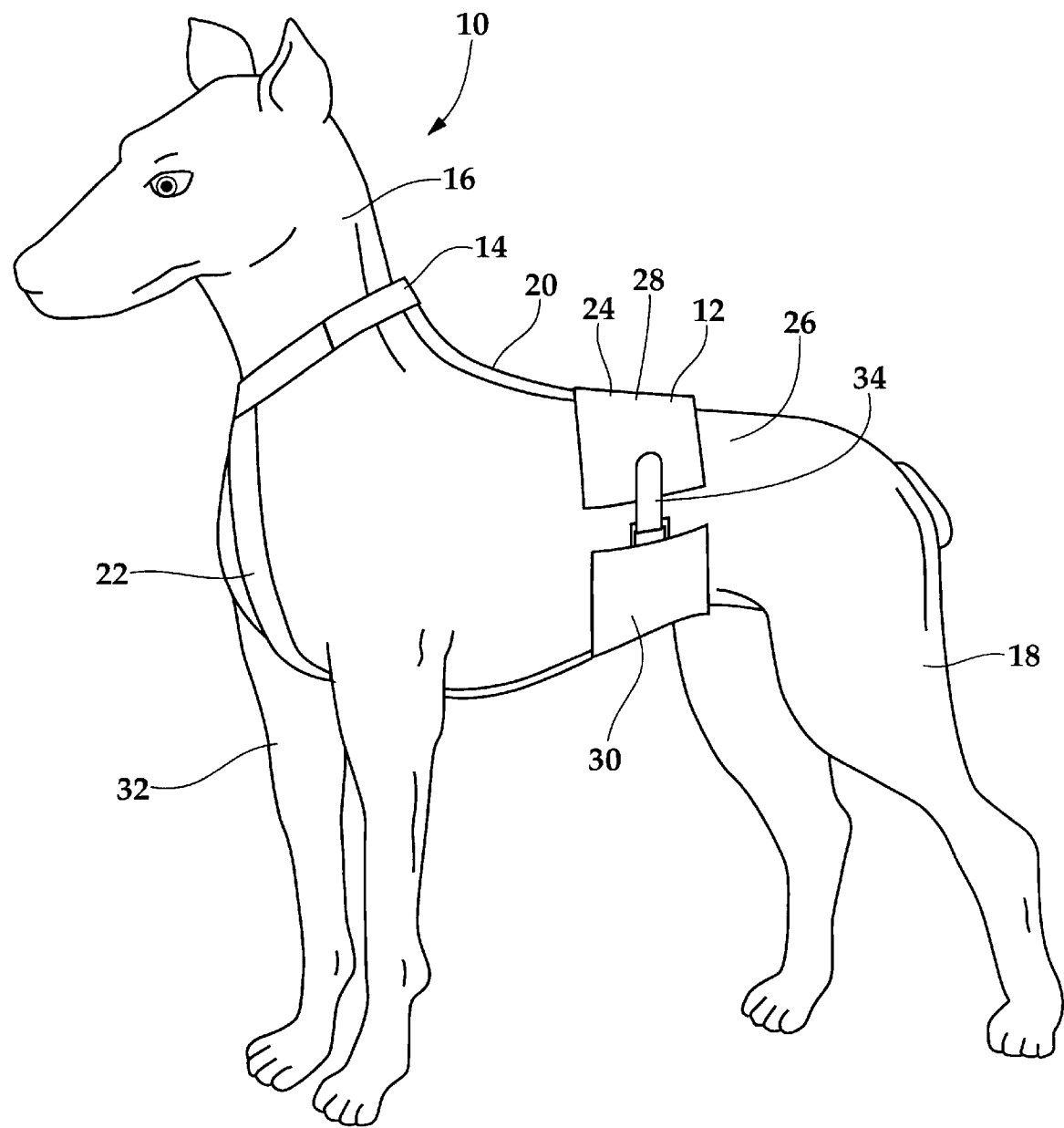
FIG. 1 is a side elevation of an animal wearing an animal training and conditioning apparatus of the present invention.

In FIG. 1, a dog wearing an animal training and conditioning apparatus is depicted and is generally designated 10. Animal training and conditioning apparatus 12 is positioned on dog 10 such that collar 14 is disposed about neck 16 of dog 10 to prevent animal training and conditioning apparatus 12 from sliding toward the dog's hind legs 18. Animal training and conditioning device 12 includes a back strap 20 that is attached to collar 14 at a point behind neck 16 of dog 10. A chest strap 22 is similarly attached to collar 14 at a point in front of neck 16 of dog 10.

A weighted vest 24 is secured around the torso 26 of dog 10. Weighted vest 24 has an upper section 28 and a lower section 30. Upper section 28 of weighted vest 24 is attached to back strap 20 such that back strap 20 may extend from collar 14 to upper portion 28 of weighted vest 24 down the middle of the back of dog 10. Upper portion 28 of weighted vest 24 extends generally perpendicularly from back strap 20 and is disposed upon the upper side of torso 26 of dog 10.

The lower portion 30 of weighted vest 24 is securably attached to chest strap 22 such that chest strap 22 extends from collar 14 to lower portion 30 of weighted vest 24 down the middle of the chest of dog 10 and between the front legs 32 of dog 10. The lower portion 30 of the weighted vest 24 extends generally perpendicularly from chest strap 22 and is disposed under the lower side of torso 26 of dog 10.

Upper portion 28 and lower portion 30 of weighted vest 24 are adjustable relative to one another via adjustment members 34 so that weighted vest 24 may fit snug and comfortably around torso 26 of dog 10.

Even though FIG. 1 depicts dog 10 wearing animal training and conditioning apparatus 12, it should be noted by one skilled in the art that animal training and conditioning apparatus 12 is equally well-suited for a variety of animals including, but not limited to, horses and tigers as well as other livestock.

With the use of animal training and conditioning apparatus 12, animals, such as dog 10, may be trained and conditioned to generally improve their physical characteristics as well as their body confirmations. In general, animal training and conditioning apparatus 12 may be used to improve the stamina, strength, speed, and lung capacity of dog 10.

Figure 2:
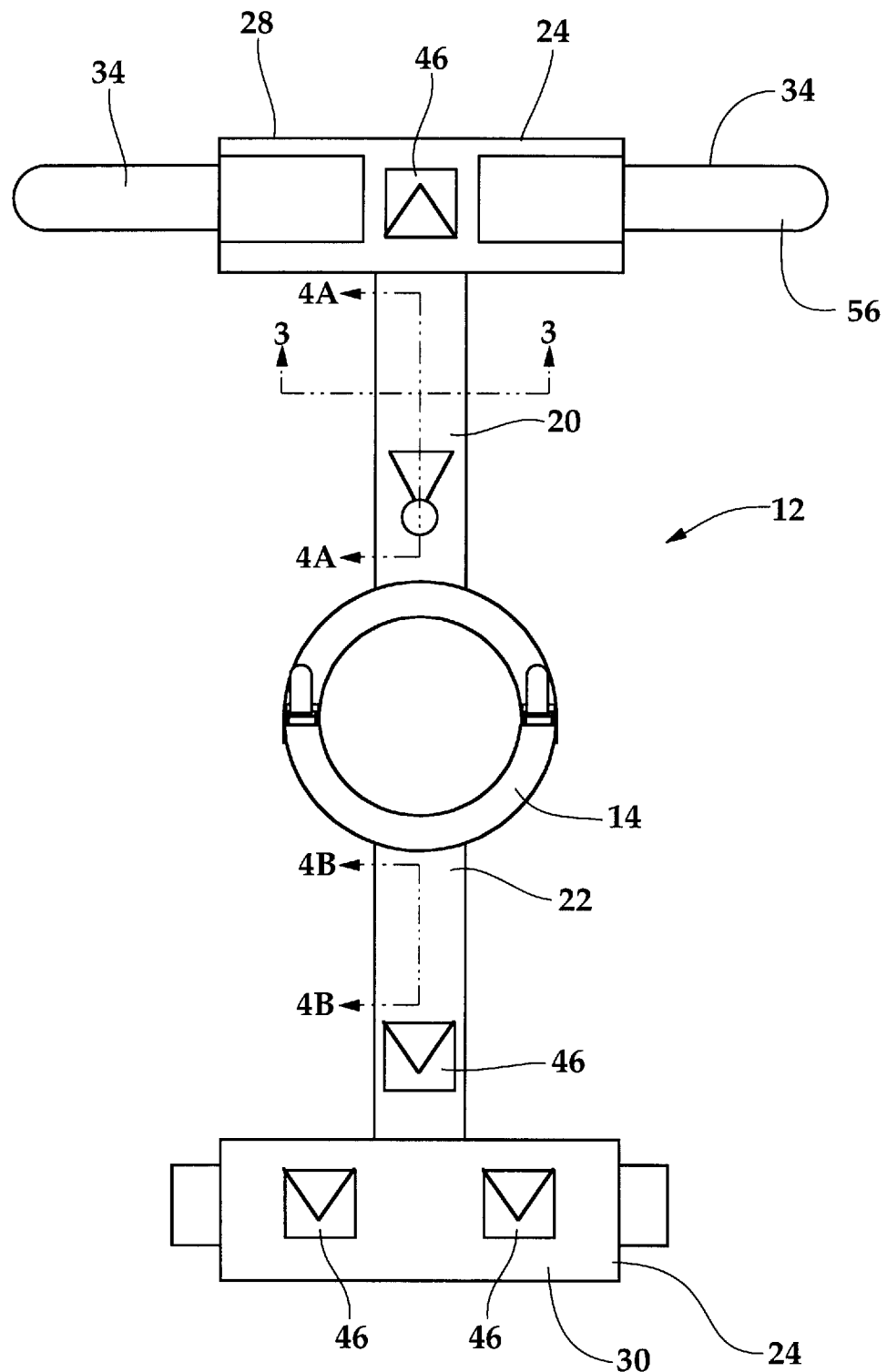
FIG. 2 is a plan view of an animal training and conditioning apparatus of the present invention.

Referring collectively to FIGS. 2, 3, 4A and 4B, a variety of views of animal training and conditioning apparatus 12 are depicted. In FIG. 2, a plan view of animal training and conditioning apparatus 12 which has been removed from dog 10. Animal training and conditioning apparatus 12 includes collar 14, back strap 20, chest strap 22, and weighted vest 24 which includes upper portion 28 and lower portion 30. As best seen in the cross sectional views in FIGS. 3, 4A and 4B, taken, respectively, along lines 3—3, 4A—4A and 4B—4B of FIG. 2, a plurality of weights 36 is disposed within back strap 20. Weights 36 may be designed in a variety of manners which are well known in the art, however, weights 36 may preferably be rectangular or oval shaped metal ingots.

It would be possible to have a single weight 36 extending down the length of back strap 20, however, as will be appreciated, back strap 20 must have sufficient flexibility to conform to the shape of the back of dog 10 in order to maximize the comfort and fit of animal training and conditioning apparatus 12.

Figure 4A:
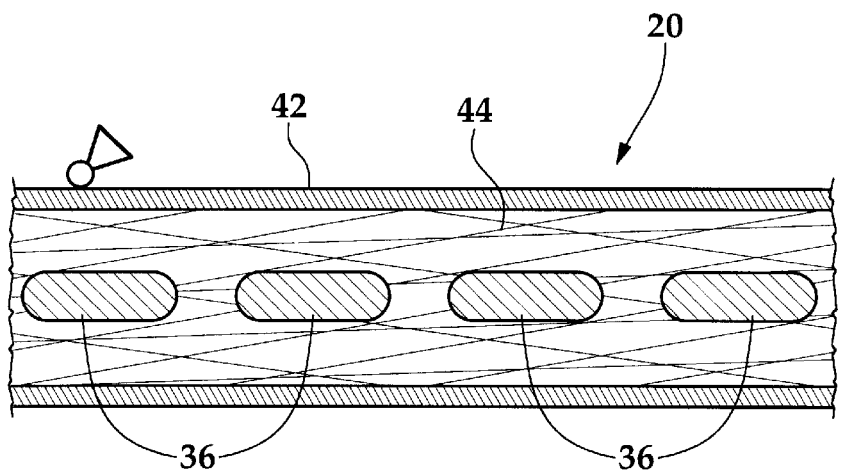
FIG. 4A is a cross sectional view of one embodiment of a back strap of an animal training and conditioning apparatus of the present invention taken along line 4A—4A of FIG. 2.
Figure 4B:
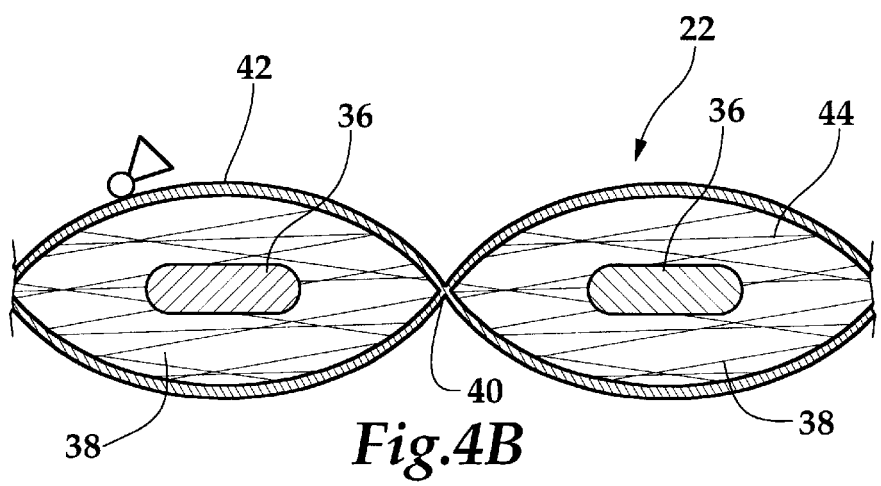
FIG. 4B is a cross sectional view of one embodiment of a chest strap of an animal training and conditioning apparatus of the present invention taken along line 4B—4B of FIG. 2.

As depicted in FIG. 4B, chest strap 22 may be constructed from a plurality of independent compartments 38 which are bendable therebetween at juncture 40. In this embodiment, if any single compartment 38 is damaged during use, only a single weight 36 is lost, thereby increasing the useful life of animal training and conditioning apparatus 12.

Animal training and conditioning apparatus 12 may be constructed from a variety of materials which have suitable strength and durability for containing weights and for use on dog 10. Materials such as nylon or a heavy fabric including canvas may be used for the outer shell 42 of animal training and conditioning apparatus 12. To provide padding and protection for dog 10, a plurality of stuffing or cushioning 44 is disposed about weight 36 within outer shell 42.

Figure 3:
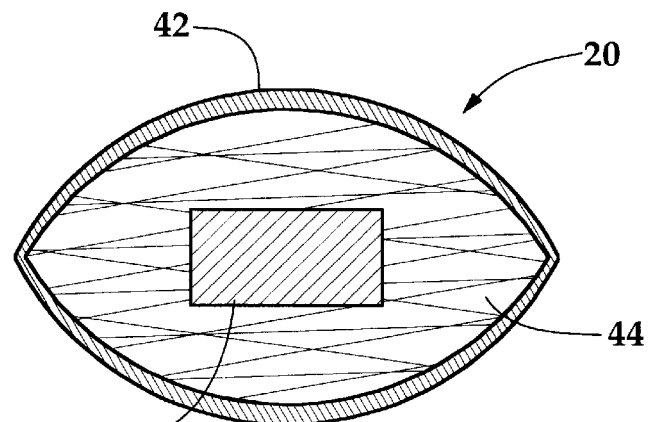
FIG. 3 is a cross sectional view of a back strap of an animal training and conditioning apparatus of the present invention taken along line 3—3 of FIG. 2.

Even though the cross sectional views in FIGS. 3 and 4A are of back strap 20 and FIG. 4B is of chest strap 22, it should be noted by one skilled in the art that collar 14, upper portion 28 of weighted vest 24 and lower portion 30 of weighted vest 24 may be constructed in a similar manner. In fact, animal training and conditioning apparatus 12 may be used to target specific muscle groups of dog 10 by strategically locating weights 36 in the various sections of animal training and conditioning device 12. For example, by placing a plurality of weights 36 within collar 14, front legs 32 and neck 16 may be targeted for training and conditioning. Also, by disposing a plurality of weights 36 within upper portion 28 and lower portion 30 of weighted vest 24, the hind legs 18 of dog 10 may be targeted for training and conditioning. By disposing a plurality of weights 36 in either back strap 20 or chest strap 22, front legs 32 and the withers region of dog 10 may be targeted for training and conditioning.

Additionally, it should be noted that the plurality of weights 36 in the upper portion 28 and lower portion 30 of weighted vest 24 should be oriented in such a manner as to generally equalize the weight distributed on the left side and the right side of dog 10 to target the training of the balance of dog 10.

In addition to the plurality of weights 36 disposed within back strap 20, chest strap 22, upper portion 28 and lower portion 30 of weighted vest 24, a plurality of pockets 46 may be disposed on animal training and conditioning apparatus 12 in strategic locations to further enhance the training of specific muscle groups of dog 10. For example, pockets 46 may be disposed upon chest strap 22 to allow for progressive resistance training of front legs 32 and the withers region of dog 10. Similarly, pockets 46 may be disposed upon upper portion 28 or lower portion 30 of weighted vest 24 to provide for progressive resistance training of hind legs 18 of dog 10. A variety of weights may be disposed within pockets 46 such as pebbles, sand, small stones or coins but, in a preferred embodiment, a plurality of metal ingots should be used in order to precisely and scientifically increase the resistance as dog 10 progresses through a specifically tailored training and conditioning program.

Figure 5:
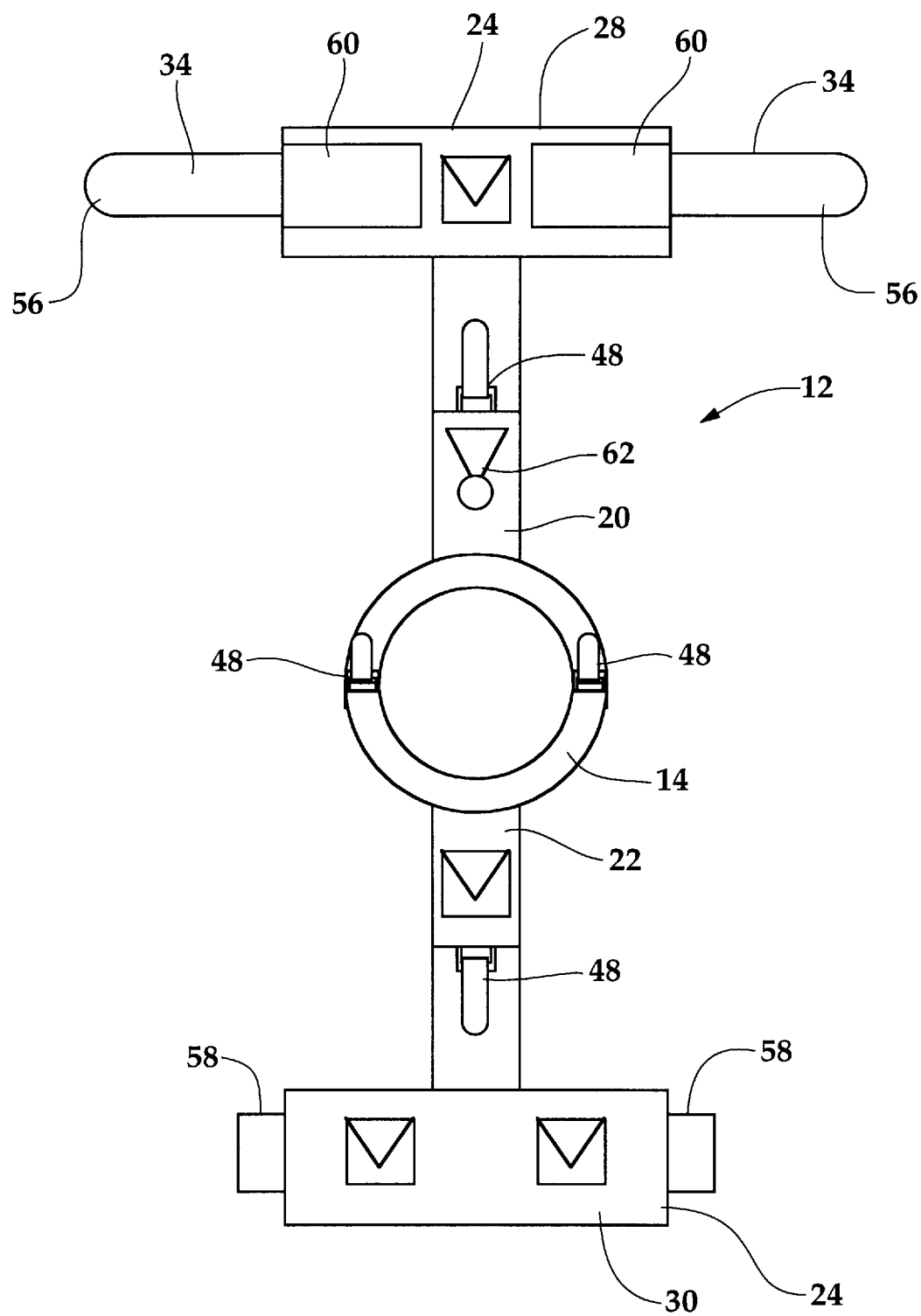
FIG. 5 is a plan view of one embodiment of an animal training and conditioning apparatus of the present invention.

Referring now to FIGS. 5 and 6, an alternate embodiment of animal training and conditioning apparatus 12 is pictured in a plan view and an exploded view, respectively. Animal training and conditioning apparatus 12 has a variety of adjustment mechanisms which allow animal training and conditioning apparatus 12 to be used on animals of various sizes such as dog 10 as it grows from a puppy to an adult dog or on more than one dog 10.

Specifically, collar 14 includes a pair of adjustment members 48. Adjustment members 48 are disposed on opposite sides of collar 14 between back strap 20 and chest strap 22 such that the size of collar 14 may be adjusted without affecting the position of back strap 20 in the middle of the back of dog 10 and chest strap 22 down the middle of the chest of dog 10 and between front legs 32 of dog 10. Adjustment members 48 may be designed using a strap 50 and hook 52 mechanism wherein strap 50 is looped through hook 52 to secure the two sections of collar 14 together. Collar 14 may also include a comfort strip 54 to protect neck 16 of dog 10 as strap 50 is maneuvered through hook 52 and to provide comfort as dog 10 wears animal training and conditioning apparatus 12. Alternatively, adjustment members 48 may be designed using fabric hook and loop fasteners or a belt buckle type arrangement which are well-known in the art. In any case, however, it is important that collar 14 has a pair of adjustment members to assure that back strap 20 and chest strap 22 are properly positionable on dog 10 as the size of collar 14 is adjusted.

Back strap 20 and chest strap 22 may also include adjustment members 48 including adjustable strap 50, hook 52 and comfort strip 54. The adjustability of back strap 20 and chest strap 22 allows for the proper positioning of weighted vest 28 on torso 26 of dog 10. Also, by adjusting back strap 20 and chest strap 22, animal training and conditioning apparatus 12 may be used on animals of a variety of sizes. It should also be noted, by one skilled in the art, that adjustment members 48 on back strap 20 and chest strap 22 may be designed in a variety of ways including using fabric hook and loop fasteners or a belt buckle type arrangement.

In order to properly fit and provide comfort to dog 10 during the use of animal training and conditioning apparatus 12, weighted vest 24 is adjustable around torso 26 of dog 10. Adjustment members 34 include straps 56 which are threaded through hooks 58 and attached to attachment members 60. In a preferred embodiment, straps 56 and attachment members 60 are fabric hook and loop fasteners which are commonly known in the art. Alternatively, adjustment member 34 may be of the type described with reference to collar 14 or may be a belt buckle type arrangement.

A leash hook 62 may be placed on back strap 20 to allow for the attachment of a leash directly to animal training and conditioning apparatus 12. Alternatively, leash hook 62 may be attached to collar 14.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An animal training and conditioning apparatus comprising:

a collar for securing the animal training and conditioning apparatus around the animal's neck and for preventing the animal training and conditioning apparatus from sliding toward the animal's hind legs;

a back strap having a first end and a second end, said first end of said back strap securably attached to said collar at a point behind the animal's neck;

a chest strap having a first end and a second end, said first end of said chest strap securably attached to said collar at a point in front of the animal's neck; and a weighted vest having an upper portion and a lower portion, said upper portion of said weighted vest securably attached to said second end of said back strap such that said back strap extends from said collar to said upper portion of said weighted vest down the middle of the animal's back, said lower portion of said weighted vest securably attached to said second end of said chest strap such that said chest strap extends from said collar to said lower portion of said weighted vest down the middle of the animal's chest and between the animal's front legs, said upper portion of said weighted vest extends generally perpendicularly from said second end of said back strap for disposition upon the upper side of the animal's torso, said lower portion of said weighted vest extends generally perpendicularly from said second end of said chest strap for disposition under the lower side of the animal's torso, said upper portion of said weighted vest being adjustable relative to said lower portion of said weighted vest to provide for a snug and comfortable fit around the animal's torso, said upper portion and said lower portion of said weighted vest have a plurality of weights disposed therein and oriented in such a manner as to generally equalize the weight distributed on the animal's left side and the animal's right side, thereby enhancing the training and conditioning of the animal's hind legs and cardiovascular system and enhancing the training of the animal's balance.

2. The animal training and conditioning apparatus as recited in claim 1 wherein said upper portion and said lower portion of said weighted vest have a plurality of pockets disposed thereon for receiving weights therein to increase the total weight of said weighted vest and to provide for progressive resistance training for the animal, thereby further enhancing the training and conditioning of the animal's hind legs and cardiovascular system.

3. The animal training and conditioning apparatus as recited in claim 1 wherein said back strap has a plurality of weights disposed therein, thereby enhancing the training of the animal's front legs and withers region.

4. The animal training and conditioning apparatus as recited in claim 1 wherein said chest strap has a plurality of weights disposed therein, thereby enhancing the training of the animal's front legs and withers region.

5. The animal training and conditioning apparatus as recited in claim 1 wherein said collar has a plurality of weights disposed therein, thereby enhancing the training of the animal's front legs and neck region.

6. The animal training and conditioning apparatus as recited in claim 1 wherein said back strap and chest strap have a plurality of pockets disposed thereon for receiving weights therein to provide for progressive resistance training for the animal, thereby enhancing the training of the animal's front legs and withers region.

7. The animal training and conditioning apparatus as recited in claim 1 wherein said back strap and chest strap are adjustable such that said weighted vest is properly positionable on the animal's torso.

8. The animal training and conditioning apparatus as recited in claim 1 wherein said collar has first and second adjustment members disposed between said back strap and said chest strap on opposite sides of said collar such that the circumference of said collar is adjustable without altering the position of said back strap and said chest strap relative to the animal.

9. The animal training and conditioning apparatus as recited in claim 1 further comprising a leash hook securably attached to said back strap.

10. An animal training and conditioning apparatus for targeting the training and conditioning of specific muscles groups, the apparatus comprising:
a collar for securing the animal training and conditioning apparatus around the animal's neck and for preventing the animal training and conditioning apparatus from sliding toward the animal's hind legs, said collar having a plurality of weights disposed therein for targeting the training and conditioning of the animal's front legs and neck region;
a back strap having a first end and a second end, said first end of said back strap securably attached to said collar at a point behind the animal's neck, said back strap having a plurality of weights disposed therein for targeting the training and conditioning of the animal's front legs and withers region;
a chest strap having a first end and a second end, said first end of said chest strap securably attached to said collar at a point in front of the animal's neck, said chest strap having a plurality of weights disposed therein for targeting the training and conditioning of the animal's front legs and withers region; and
a weighted vest having an upper portion and a lower portion, said upper portion of said weighted vest securably attached to said second end of said back strap such that said back strap extends from said collar to said upper portion of said weighted vest down the middle of the animal's back, said lower portion of said weighted vest securably attached to said second end of said chest strap such that said chest strap extends from said collar to said lower portion of said weighted vest down the middle of the animal's chest and between the animal's front legs, said upper portion of said weighted vest extends generally perpendicularly from said second end of said back strap for disposition upon the upper side of the animal's torso, said lower portion of said weighted vest extends generally perpendicularly from said second end of said chest strap for disposition under the lower side of the animal's torso, said upper portion of said weighted vest being adjustable relative to said lower portion of said weighted vest to provide for a snug and comfortable fit around the animal's torso, said weighted vest having a plurality of weights disposed therein for targeting the training and conditioning of the animal's hind legs.

11. The animal training and conditioning apparatus as recited in claim 10 wherein said upper portion and said lower portion of said weighted vest have a plurality of pockets disposed thereon for receiving weights therein to further target the training and conditioning of the animal's hind legs by providing for progressive resistance training for the animal's hind legs.

12. The animal training and conditioning apparatus as recited in claim 10 wherein said back strap and chest strap have a plurality of pockets disposed thereon for receiving weights therein to further target the training and conditioning of the animal's front legs and withers region by providing for progressive resistance training for the animal's front legs and withers region.

13. The animal training and conditioning apparatus as recited in claim 10 wherein said plurality of weights in said upper portion and said lower portion of said weighted vest are oriented in such a manner as to generally equalize the weight distributed on the animal's left side and the animal's right side to target the training of the animal's balance.

14. The animal training and conditioning apparatus as recited in claim 10 wherein said back strap and chest strap are adjustable such that said weighted vest is properly positionable on the animal's torso.

15. The animal training and conditioning apparatus as recited in claim 10 wherein said collar has first and second adjustment members disposed between said back strap and said chest strap on opposite sides of said collar such that the circumference of said collar is adjustable without altering the position of said back strap and said chest strap relative to the animal.

16. The animal training and conditioning apparatus as recited in claim 10 further comprising a leash hook securably attached to said back strap.

17. An animal training and conditioning apparatus comprising:
a collar for securing the training and conditioning apparatus around the animal's neck and for preventing the animal training and conditioning apparatus from sliding toward the animal's hind legs, said collar having first and second adjustment members each disposed on opposite sides of said collar such that the circumference of said collar is adjustable without rotating said collar relative to the animal's neck;
a back strap having a first end and a second end, said first end of said back strap securably attached to said collar at a point behind the animal's neck, said back strap having an adjustment member located between said first end and said second end of said back strap to adjust the distance between said first end and said second end of said back strap;
a chest strap having a first end and a second end, said first end of said chest strap securably attached to said collar at a point in front of the animal's neck, said chest strap having an adjustment member located between said first end and said second end of said chest strap to adjust the distance between said first end and said second end of said chest strap; and
a weighted vest having an upper portion and a lower portion, said upper portion of said weighted vest securably attached to said second end of said back strap such that said back strap extends from said collar to said upper portion of said weighted vest down the middle of the animal's back, said lower portion of said weighted vest securably attached to said second end of said chest strap such that said chest strap extends from said collar to said lower portion of said weighted vest down the middle of the animal's chest and between the animal's front legs, said upper portion of said weighted vest extends generally perpendicularly from said second end of said back strap for disposition upon the upper side of the animal's torso, said lower portion of said weighted vest extends generally perpendicularly from said second end of said chest strap for disposition under the lower side of the animal's torso, said upper portion of said weighted vest being adjustable relative to said lower portion of said weighted vest to provide for a snug and comfortable fit around the animal's torso, thereby enhancing the training and conditioning of the animal's hind legs and cardiovascular system.

18. The animal training and conditioning apparatus as recited in claim 17 wherein said back strap said chest strap have a plurality of weights disposed therein, thereby enhancing the training of the animal's front legs and withers region.

19. The animal training and conditioning apparatus as recited in claim 17 wherein said collar has a plurality of weights disposed therein, thereby enhancing the training of the animal's front legs and neck.

\* \* \* \* \*